United States Patent
Mundarath et al.

(10) Patent No.: US 11,005,630 B1
(45) Date of Patent: May 11, 2021

(54) EFFICIENT DETECTION OF PRIMARY BROADCAST CHANNEL IN 5G-NR

(71) Applicant: NXP USA, Inc., Austin, TX (US)

(72) Inventors: Jayakrishnan Cheriyath Mundarath, Austin, TX (US); Jayesh H. Kotecha, Austin, TX (US)

(73) Assignee: NXP USA, INC., Austin, TX (US)

( * ) Notice: Subject to any disclaimer, the term of this patent is extended or adjusted under 35 U.S.C. 154(b) by 30 days.

(21) Appl. No.: 16/654,749

(22) Filed: Oct. 16, 2019

(51) Int. Cl.
| | |
|---|---|
| H04L 5/00 | (2006.01) |
| H04L 1/00 | (2006.01) |
| H04L 25/02 | (2006.01) |
| H04W 72/02 | (2009.01) |
| H04W 72/00 | (2009.01) |

(52) U.S. Cl.
CPC .......... *H04L 5/0051* (2013.01); *H04L 1/0047* (2013.01); *H04L 1/0052* (2013.01); *H04L 1/0057* (2013.01); *H04L 25/0204* (2013.01); *H04W 72/005* (2013.01); *H04W 72/02* (2013.01)

(58) Field of Classification Search
None
See application file for complete search history.

(56) References Cited

U.S. PATENT DOCUMENTS 9,525,445 B2 * 12/2016 Rahman ............... H04B 1/1027
2018/0262308 A1 * 9/2018 Si ....................... H04L 27/2613

OTHER PUBLICATIONS

Mathworks, Inc., NR Synchronization MATLAB reference code, 2018 https://www.mathworks.com/help/5g/examples/NR-Synchronization-Procedures.html#d120e620.
Lin et al., "5G New Radio: Unveiling the Essentials of the Next Generation Wireless Access Technology," arXiv:1806.06898v1 [cs.NI], 2018.
RF Wireless World, "5G NR Initial Access Procedure | 5G NR Random Access Procedure," 2018 https://rfwireless-world.com/5G/5G-NR-Initial-Access-Procedure.html.

* cited by examiner

*Primary Examiner* — Hong S Cho

(57) ABSTRACT

A mechanism is provided for detecting and decoding a primary broadcast channel transmitted by a base station at a user equipment device. Embodiments improve performance and robustness over prior methods for detecting and decoding by determining a channel differential metric for channel estimates derived based on each candidate demodulation reference symbol (DMRS) sequence and selecting a set of top DMRS sequence candidates using the associated channel differential metrics. From the set of top DMRS candidates, a best DMRS candidate, and consequently, the three least significant bits of the beam index, can be determined.

20 Claims, 8 Drawing Sheets

EFFICIENT DETECTION OF PRIMARY BROADCAST CHANNEL IN 5G-NR

BACKGROUND

Field

This disclosure relates generally to 5G-NR (New Radio) initial access procedure, and more specifically, to a fast and low complexity mechanism for primary broadcast channel detection and decoding.

Related Art

As mobile computing devices, such as smart phones, provide greater amounts of computing power, so too does the demand for greater amounts of data transfer. 5G-NR (New Radio) is the latest cellular wireless technology following the 3GPP specification release 15 and above, and has been developed to provide data speeds as much as ten times that of 4G (LTE) technology. The new technology also provides updated methods for mobile devices to connect with a base station (e.g., a cellular tower).

In some instances of 5G wireless network technologies being developed and deployed, millimeter wave (mm-wave) data transmission has emerged as a highly promising approach to achieving gigabit per second throughput in wireless communication links. This is due to such transmission providing orders of magnitude more spectrum than the presently-congested bands in conventional ultra-high frequency and microwave frequencies below 3 GHz. But, due to very high carrier frequencies, mm-wave signals can experience poor propagation and large isotropic path loss. To overcome this large isotropic path loss, mm-wave signal schemes rely heavily on highly directional transmissions, provided by, for example, electrically steerable antenna elements that implement beamforming techniques for transmitting and receiving communications.

Use of directional transmissions can significantly complicate the process of initial access by a user equipment (UE) client device (i.e., a mobile device). During initial access a UE discovers a potential cell and establishes a link-layer connection with the corresponding base station (BS). To enable mutual detection between the BS and the UE, the initial access procedure in mm-wave cells provides a mechanism by which both the the UE and the BS can determine suitable beamforming directions on which subsequent directional communication can be carried out.

In one proposal for establishing initial beamforming directions between a UE and BS, the 5G-NR wireless standard specifies an initial access scheme in which a BS uses a fixed time and frequency grid to transmit a plurality of synchronization signal blocks (SSB) on differentially directed transmit beams to identify the available transmit beams. SSB blocks carry primary and secondary synchronization channels (PSS and SSS, respectively) that enable a UE to acquire timing information for the uplink and downlink transmissions as well as reference frame and transmission time interval indices. The SSB also carries a master information block (MIB) in a physical channel called a primary broadcast channel (PBCH) that contains information about the network, including a downlink beam index used to transmit the SSB. The initial uplink transmission by the UE, which is part of a procedure to register with the network (known as a RACH procedure), indicates to the network the downlink beam index on which the UE decoded the MIB. This provides the base station with information about the downlink beam to use for that particular UE.

Downlink beam information is carried in part explicitly and in part implicitly as information carried on the PBCH. 5G-NR allows up to 64 downlink beams during SSB transmission, and therefore a six-bit beam index is needed to identify each beam. Three of the six bits of the beam index are carried explicitly as part of the MIB payload. The other three bits of the beam index are signal implicitly using demodulation reference signals (DMRS). DMRS are pilot subcarriers embedded in the PBCH transmission to facilitate estimation of the downlink channel at each UE. One of eight different DMRS sequences can be used to transmit the pilot subcarriers based on the three implicit bits corresponding to the beam index. The UE then reconstructs the six-bit beam index (e.g., three bits acquired via demodulation to identify the correct DMRS sequence and three bits identified by decoding the MIB). Decoding the MIB and identifying the correct beam index is a critical part of initial acquisition, and having a robust mechanism for MIB detection is essential to ensuring connectivity in a 5G network. Further, there are stringent complexity requirements on the UE so that the UE uses compute resources efficiently. It is therefore important to have a robust, low-complexity solution to detect the beam index as part of the initial acquisition process, and subsequently during a background cell search process for handovers, and the like.

BRIEF DESCRIPTION OF THE DRAWINGS

Embodiments of the present invention may be better understood by referencing the accompanying drawings.

The use of the same reference symbols in different drawings indicates identical items unless otherwise noted. The figures are not necessarily drawn to scale.

DETAILED DESCRIPTION

Embodiments of the present invention provide a mechanism for detecting and decoding a primary broadcast channel transmitted by a base station at a user equipment device. Embodiments improve performance and robustness over prior methods for detecting and decoding by determining a channel differential metric for channel estimates derived based on each candidate demodulation reference symbol (DMRS) sequence and selecting a set of top DMRS sequence candidates using the associated channel differential metrics. From the set of top DMRS candidates, a best DMRS candidate, and consequently, the three least significant bits of the beam index, is determined.

Figure 1:
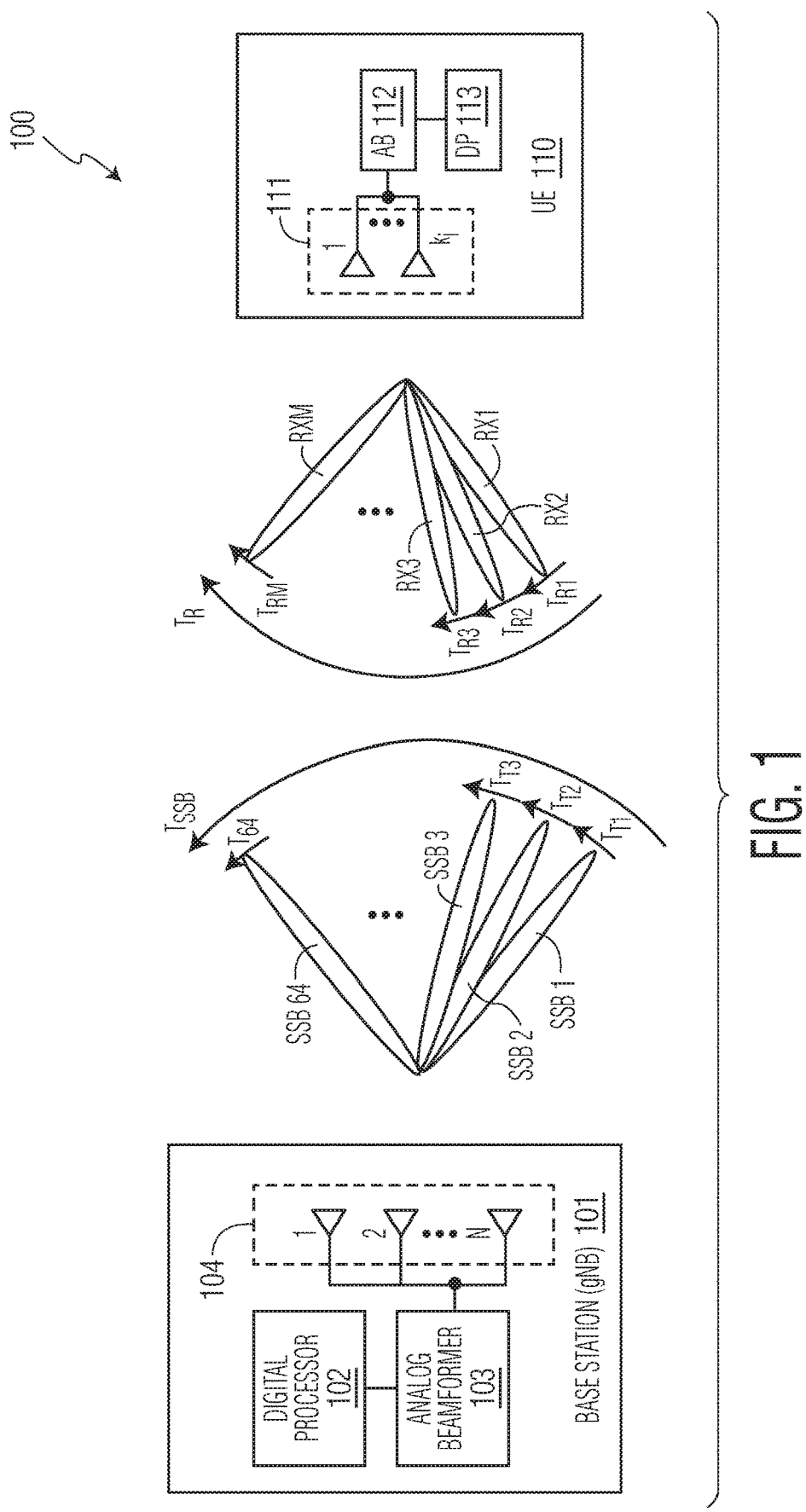
FIG. 1 is a simplified block diagram illustrating a wireless communication system in which a base station and user equipment are each equipped, respectively, with transmit/receive multi-antenna array systems.

Reference is now made to FIG. 1 which is a simplified block diagram illustrating a wireless communication system 100 in which a base station (gNB) 101 and user equipment (UE) 110 are each equipped, respectively, with transmit/receive multi-antenna array systems 104, 111. In a given geographic area, the wireless communication system 100 may include one or more base stations 101 to communicate with one or more UEs 110 (e.g., subscriber stations) by equipping the base stations 101 and UEs 110 with transmitters and receivers. Base station 101 can use beamforming techniques to transmit one or more data streams through the transmit antenna array 104, and UE 110 combines the received signal from the receive antenna array 111 to reconstruct the transmitted data. This is accomplished using "beamforming," whereby each data signal $s_i$ is processed by a digital signal processor 102 and analog/digital beamformer 103 for transmission by applying a weight vector $w_i$ to the signal $s_i$ and transmitting the result $x_i$ over the transmit antenna array 104. The weight vector $w_i$ is used to directionalize the signal with the objective of enhancing the signal quality or performance metric, like signal-to-interference-and-noise ratio (SINR) of the received signal at the receiver station 110. At UE 110, the received signals detected at the receive antenna array 111 are processed using a combining vector $v_i$ that is applied by analog beamformer (AB) 112 and digital signal processor (DP) 113.

In an example embodiment where the base station 101 has an array of N transmit antennas 104, the digital signal processor 102 and analog beamformer 103 prepare a transmission signal, represented by the vector $x_i$, for each signal $s_i$. The transmission signal vector $x_i$ is determined in accordance with equation $x_i = w_i \cdot s_i$, where $w_i$ is the $i^{th}$ beamforming, N dimensional transmission weight vector (also referred to as a "transmit beamformer"), and each coefficient $w_j$ of weight vector $w_i$ represents a weight and phase shift on the $j^{th}$ transmit antenna 104.

At UE 110, the transmitted signals are received on the $k_j$ receive antennas in the receive antenna array 111. For example, the transmission signal vector $x_1$ is transmitted via a channel represented by a channel matrix $H_1$, and is received at the receiver 110 as a receive signal vector $y_1 = H_1^H x_1 + n_1$, where $n_1$ represents noise and any co-channel interference caused by other subscriber stations, and "$H_1^H$" represents the complex conjugate transpose of the channel matrix correlating the base station 101 and UE 110. The superscript "H" is used herein as a hermitian operator to represent a complex conjugate transpose operator. The $j^{th}$ element of the received signal vector $y_1$ represents the signal received on the $j^{th}$ antenna of UE 110, $j \in \{1, 2, \ldots, k_j\}$. To obtain a data signal, $z_1$, which is an estimate of the transmitted data $s_1$, the digital signal processor (DP) 113 and analog beamformer (AB) 112 at UE 110 combine the signals received on the $k_j$ antennas of the array 111 using a combining vector $v_1$ in accordance with the equation, $z_1 = y_1^H v_1$.

With emerging 5G wireless communications, massive MIMO techniques are proposed for using antenna arrays 104 and 111 which include arrays of elements driven by individual signals to create multiple signal beams over multiple paths. At the location of UE 110, signals from all these paths may be added constructively to enabling a high data rate by using multichannel phase shifting techniques to combine the signals from the multiple paths. In selected analog antenna embodiments, multichannel phase shifting can be done in the analog domain, by taking the transmit data stream, dividing it as many ways as there are elements in the antenna array, and then applying phase shifting to each of them. But due to the inflexibility of such analog systems that can only handle one data stream and generate therefrom one signal beam, another digital antenna approach provides each element of the antenna array with its own transceiver and set of data converters, thereby providing the ability to handle multiple data streams and generate multiple beams from one array.

With increasing reliance on directional transmit and receive beamforming techniques for overcoming high isotropic path loss with next generation mmWave cellular communication systems, such as 5G-NR, there are associated control and setup challenges. For example, initial access procedures can be significantly delayed due to the need for the base station and the UE to find the initial directions of transmission. With typical cell acquisition techniques where the UE 110 relies on a synchronization signal block (SSB) to acquire initial access, base station 101 will transmit, periodically or aperiodically, the SSB on each beamformed TX beam, thereby forming an SSB burst which has a specified SSB duration (specifying the total time for transmitting SSBs spanning the entirety of all supported TX beams/directions) and a specified SSB period (specifying the periodic repetition rate between SSB bursts). In the example of FIG. 1, each SSB burst includes SSB transmissions that are sent on 64 TX beams (e.g., SSB 1-SSB 64). With each SSB transmission having a fixed length ($T_B$) occurring within a time span of fixed duration ($T_{Ti}$), the multiple SSB transmissions ($T_{T1} + T_{T2} + \ldots T_{T64} = T_{SSB}$) in each SSB burst will have a specified SSB burst duration (e.g., 5 ms) that is less than the SSB burst period, $T_{SSBPERIOD}$, (e.g., 20 ms) for periodically repeating each SSB burst.

5G-NR (New Radio) supports operation in a frequency spectrum ranging from sub-1 GHz to millimeter wave (mmWave) bands. Two frequency ranges are defined in the 5G-NR standard: FR1 (450 MHz-6 GHz) and FR2 (24.25 GHz-52.6 GHz). FR2 is commonly referred to as mmWave. In order to handle such a wide range of frequency spectrum, 5G-NR adopts a flexible subcarrier spacing of $2^\mu \cdot 15$ kHz ($\mu = 0, 1, \ldots, 4$), which is scaled from the basic 15 kHz subcarrier spacing in 4G-LTE. By using such a scalable design, a wide range of deployment scenarios and carrier frequencies are allowed. For example, at lower frequencies (FR1), cells can be larger and subcarrier spacings of 15 kHz and 30 kHz are suitable. At higher frequencies (FR2/mmWave), phase noise is more problematic, and 5G-NR supports 60 kHz and 120 kHz for data channels and 120 kHz and 240 kHz for initial access synchronization signal block (SSB) transmission.

A 5G-NR transmission is divided up into frames, which have a duration of 10 ms and include 10 subframes—the same as for 4G-LTE. Each subframe includes $2^\mu$ slots of 14 symbols each. A slot is a typical unit for transmission upon which scheduling operates, but 5G-NR can allow transmission to start at any symbol and last only as many symbols as needed for communication. This facilitates low latency for critical data transfer. Latency optimization is an important consideration for 5G-NR, and many features have been built into the standard to reduce latency. Embodiments of the present invention provide additional improvements to latency while at the same time improve robustness for initial beam access.

As discussed above, a UE is constantly determining whether the UE is communicating with the base station on the best beam. The standard facilitates this determination with synchronization signal block (SSB) transmissions periodically being provided by the base station. SSB subcarrier spacing can be 15 or 30 kHz in FR1 and 120 or 240 kHz in mmWave. By detecting a SSB, a UE can obtain important information such as physical cell identity, achieve downlink synchronization in both time and frequency domain, and acquire timing for the primary broadcast channel (PBCH). The PBCH carries basic system information.

Figure 2:
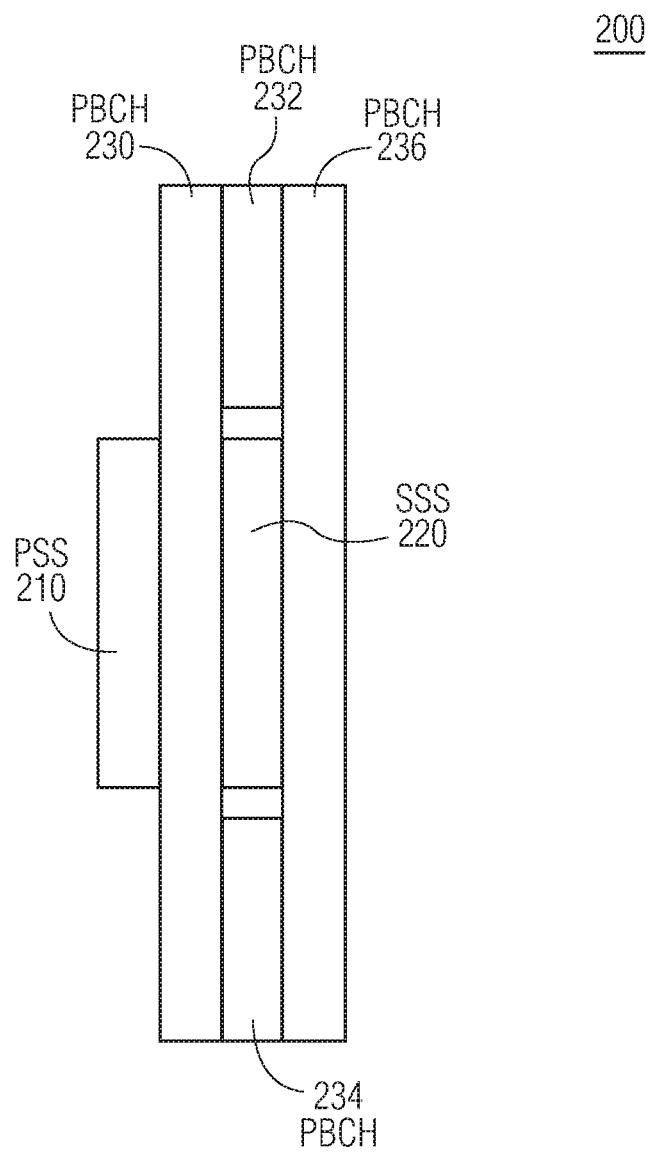
FIG. 2 is a simplified block diagram illustrating a SSB used in the 5G-NR standard.

FIG. 2 is a simplified block diagram illustrating a SSB 200 used in the 5G-NR standard. A primary synchronization sequence 210 (PSS) and a secondary synchronization sequence 220 (SSS) are provided in SSB 200. In addition, four pieces of SSB 200 include primary broadcast channel (PBCH), 230, 232, 234, and 236. The PBCH includes a master information block (MIB) that provides some of the data allowing the UE to determine the carrier on which the UE should communicate, as will be discussed in greater detail below.

An SSB is mapped to 4 symbols in the time domain and 240 contiguous subcarriers in the frequency domain. To support beamforming for initial access, an SS burst set is provided in 5G-NR to support possible beam sweeping for SSB transmission. Multiple SSBs are transmitted in a localized burst set in conjunction with a sparse burst set periodicity (e.g., a default of 20 ms). Within an SS burst set period, up to 64 SSBs can be transmitted in different beams. Transmission of SSBs within a SS burst set is limited to a 5 ms window. The set of possible SSB time locations within an SS burst set depends upon the frequency band, and the frequency location of a SSB is not necessarily aligned with a beginning of a resource block in the frequency domain. At mmWave frequencies, a number of possible candidate SSB locations within a SS burst set are 64. These 64 candidate locations are the SSB time index.

Each SSB in a SS burst set (i.e., all SSBs within the 5 ms period of SS burst transmission) is assigned a unique number from 0 to 63 in mmWave. This number is reset in the next SS burst set (i.e., the next 5 ms span after the SS burst set transmission cycle). This unique number is the SSB time index and the six bits of this number (at mmWave frequencies) are transmitted to the UE via two different parts of the SSB. The three least significant bits of a SSB index are determined from a one-to-one mapping with an index of demodulation reference symbols (DMRS) transmitted in the PBCH, while the three most significant bits are determined by examination of PBCH payload bits.

A PBCH DMRS is a special type of physical layer signal that functions as a reference signal for decoding the PBCH. This is not present in 4G-LTE, and thus creates an issue that needs resolving in 5G-NR. The equation for generating the PBCH DMRS includes a pseudo random sequence initialization value that is made up of components such as physical cell identifier, SSB index, and half frame number. Thus, by decoding the PBCH DMRS, the UE can determine the SSB index and identify the half frame that included the SSB. In addition, this information allows for the decoding of the PBCH itself and thus a determination of the most significant bits of the SSB index therein.

In light of the above, as a part of a process for demodulating and decoding the SSB, the UE needs to determine which of the possible 3-bit sequences have been used to transmit the PBCH DMRS. By doing so, the UE can decode the MIB and thereby set up an opportunity to connect to the base station.

Embodiments of the present invention thus relate to improving demodulation and decoding performance at the UE after the UE receives the SSB burst set. In a typical UE system, the UE scans the medium to detect a PSS (e.g., 210) corresponding to a SSB transmission. This includes continuously correlating the received waveform across all possible PSS sequences and extracting a strongest correlation peak. A strong correlation peak indicates the presence of a SSB on a beam in the beam sweep that was most effective at directing the signal toward the UE. Upon a PSS detection, an SSS (e.g., 220) detection is performed. Subcarriers associated with the SSS are extracted and correlated with each possible SSS sequence. Indices of the strongest PSS and SSS sequences are combined to give a physical layer cell identity, which is used for PBCH DMRS and PBCH processing.

At this point, in a process similar to SSS search, subcarriers corresponding to PBCH DMRS are extracted and correlated with each possible PBCH DMRS sequence. The "correct" DMRS sequence is first identified—the strongest PBCH DMRS identified determines the three least significant bits of the SSB index, and is also used for channel estimation and demodulation of the PBCH as well as for scrambling initialization.

Figure 3:
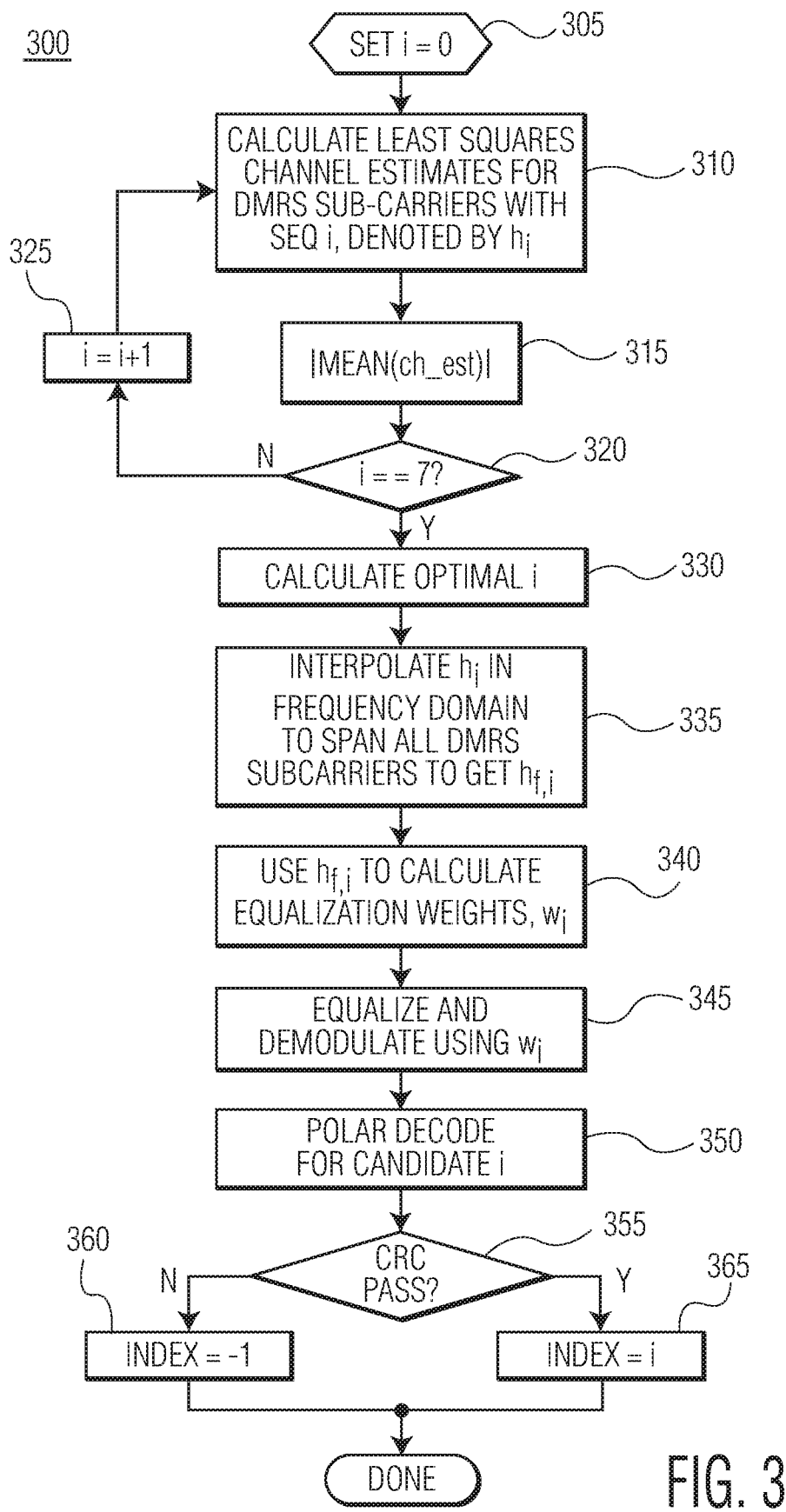
FIG. 3 is a simplified flow diagram illustrating a process for determining the three least significant bits of the SSB index.

FIG. 3 is a simplified flow diagram 300 illustrating the above process for determining the three least significant bits of the SSB index as typically performed. An index i is initialized to zero (305). Then, a least squares channel estimate is calculated for the DMRS subcarriers within the PBCH (310). The least squares channel estimation calculates the following:

$$\hat{h}_i(j) = r(j) * p_{dmrs,i}(j), j=1,2,\ldots,K$$

In this equation:
K is the length of the DMRS sequence (equal to number of DMRS subcarriers within PBCH symbols)
$p_{dmrs,i}(.)$ is the sequence of DMRS subcarriers for index, i
r(.) is the sequence of received frequency domain subcarriers corresponding to PBCH-DMRS locations
$\hat{h}_i(.)$ are the least squares channel estimates for the PBCH subcarrier locations Thus, the eight DMRS channel estimate candidates are formed as $\hat{h}_1(.), \hat{h}_2(.), \ldots, \hat{h}_8(.)$.

Once the least squares channel estimate candidates are determined, the absolute value of the mean of the channel estimate (315) is used for each index (325), until a mean for each index is calculated (320), as a metric to choose the best index i (330). Once the optimal i is chosen, $\hat{h}_i$ is interpolated in the frequency domain to span all DMRS subcarriers to determine $\hat{h}_{f,i}$ (335) and equalization weights $\hat{w}_i$ are calculated using $\hat{h}_{f,i}$ (340). Demodulation (345) and decoding (350) of the PBCH is then performed in light of the equalization weights.

If the demodulated/decoded PBCH passes a cyclic redundancy check (355), then i is the proper index (365), and if not, then the index is incorrect (360) and a new determination needs to be made to find the appropriate index. Thus, if the selected index is incorrect (as selected in steps 315-330), then a significant amount of resources and time are expended before determining that the index was incorrect, and then the whole process needs to be repeated. This results in an increase in latency in time to acquire the proper beam for the UE. The performance of this method degrades with channel and phase noise and is therefore not a good choice for additive white gaussian noise channels, which is common in mmWave applications.

Embodiments of the present invention improve performance and are more robust in overcoming influences of channel and phase noise. Through introduction of a better performing index estimation algorithm, embodiments improve decoder candidate selection during initial acquisition, thereby reducing latency during initial acquisition. Embodiments also provide additional robustness in soft handoff situations, where the MIB bits for a new base station are provided to the UE by the current base station, by improving beam selection performance (e.g., SSB index estimation).

Embodiments employ a methodology for early detection of the DMRS, thereby potentially avoiding several of the steps executed in the method of FIG. 3. This methodology exploits frequency domain correlation in the channel, allowing for a low complexity algorithm to detect a correct DMRS sequence.

Figure 4:
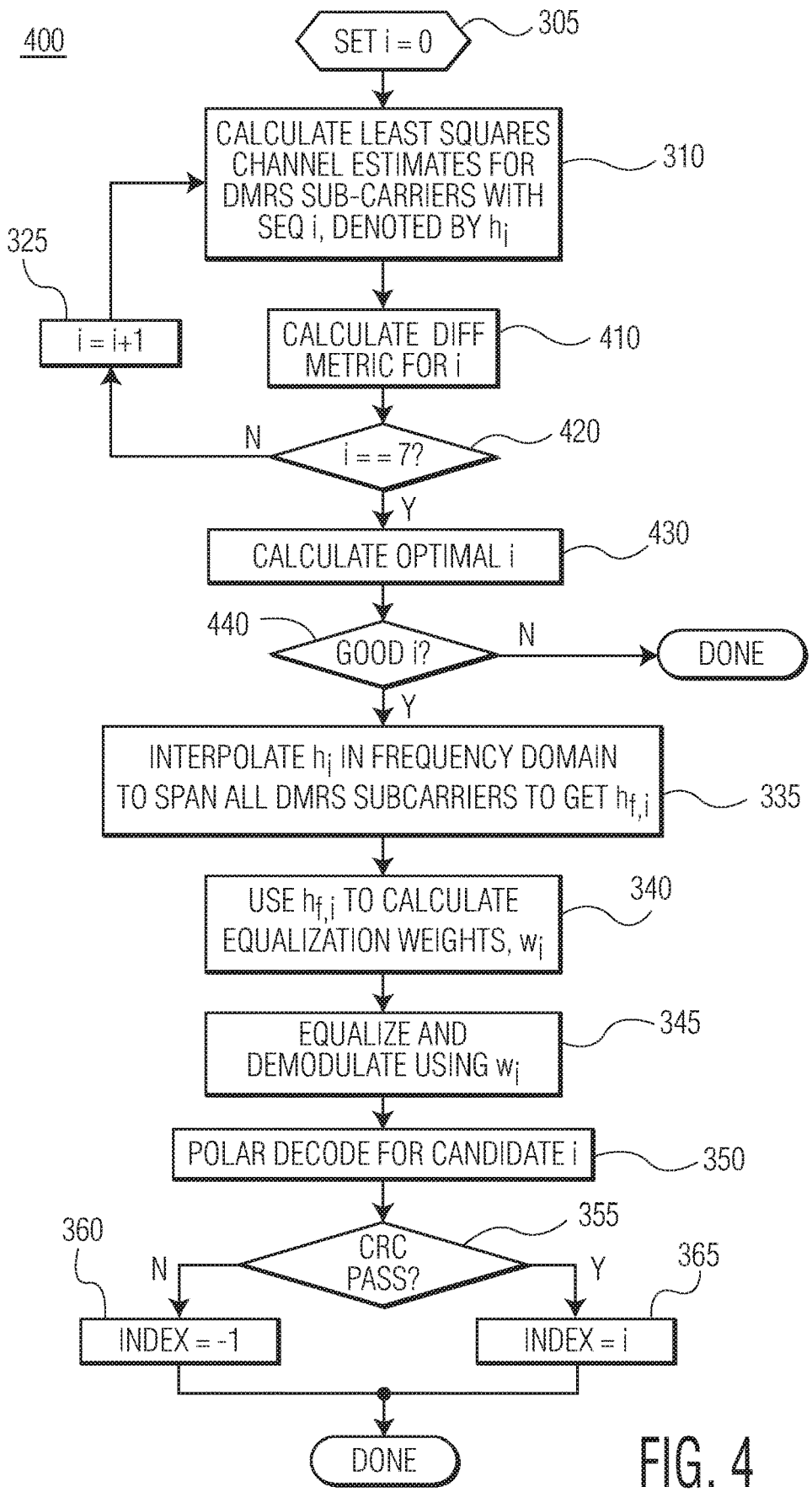
FIG. 4 is a simplified flow diagram illustrating a process for determining the three least significant bits of the SSB index, in accord with embodiments of the present invention.

FIG. 4 is a simplified flow diagram illustrating a process for determining the three least significant bits of the SSB index, in accord with embodiments of the present invention. Embodiments modify the channel selection portion of FIG. 3 (steps 315-330) and provide an enhancement (steps 410-440) where a best channel is selected for demodulation and decoding.

As discussed above with respect to FIG. 3, a least squares channel estimation is performed, which provides the eight DMRS channel estimate candidates are formed as $\hat{h}_1(.)$, $\hat{h}_2(.)$, ..., $\hat{h}_8(.)$ (310). The DMRS subcarriers are spread across three OFDM symbols in four contiguous chunks (e.g., two separate chunks in symbol 2). For each channel estimate, $\hat{h}_i(.)$, $K_1$, $K_2$, $K_3$, and $K_4$ are the number of DMRS subcarriers on each chunk, respectively and thus $K=K_1+K_2+K_3+K_4$.

Figure 6A:
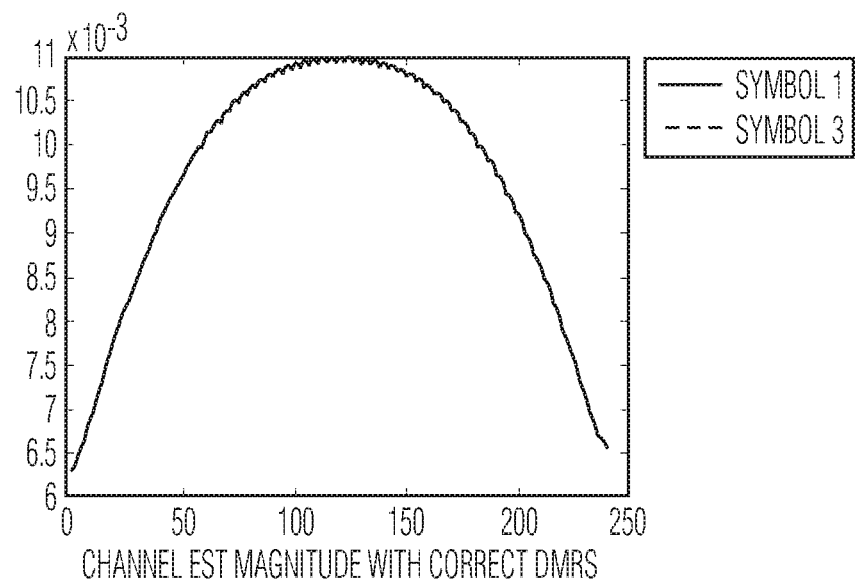
FIGS. 6A-6D are a set of plot diagrams illustrating differences in magnitude and phase with correct and incorrect DMRS selection.
Figure 6B:
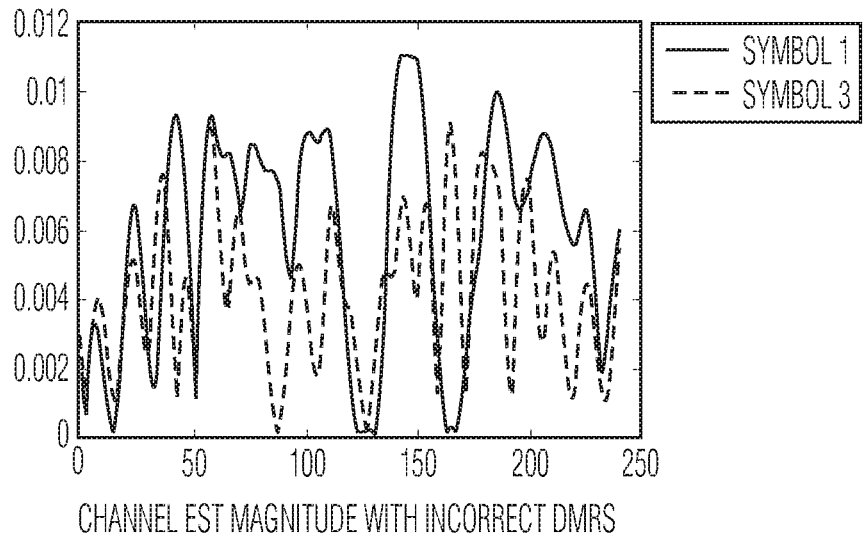
Figure 6C:
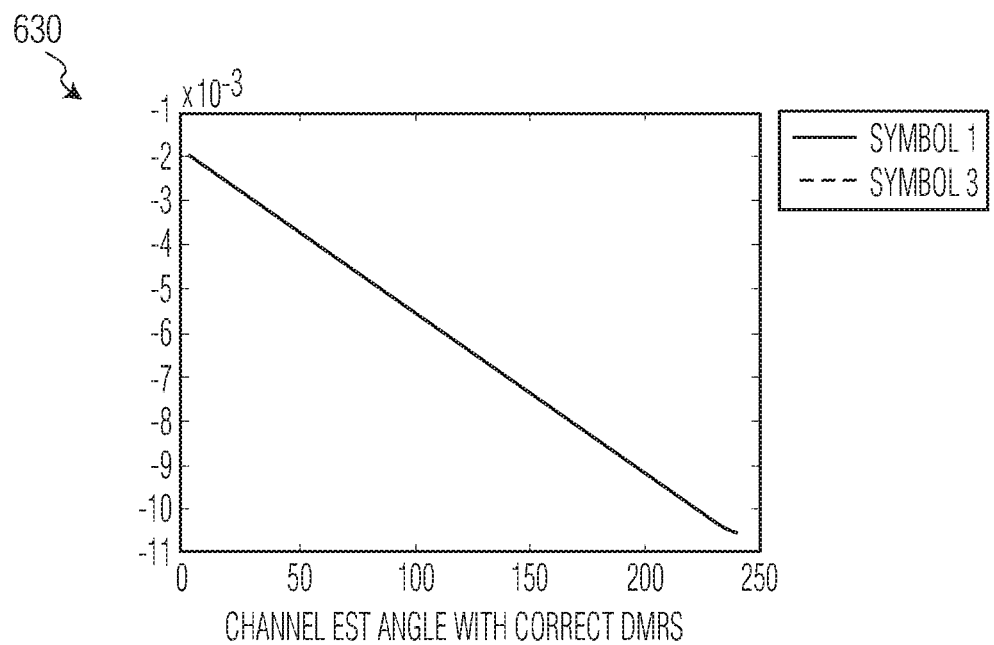
Figure 6D:
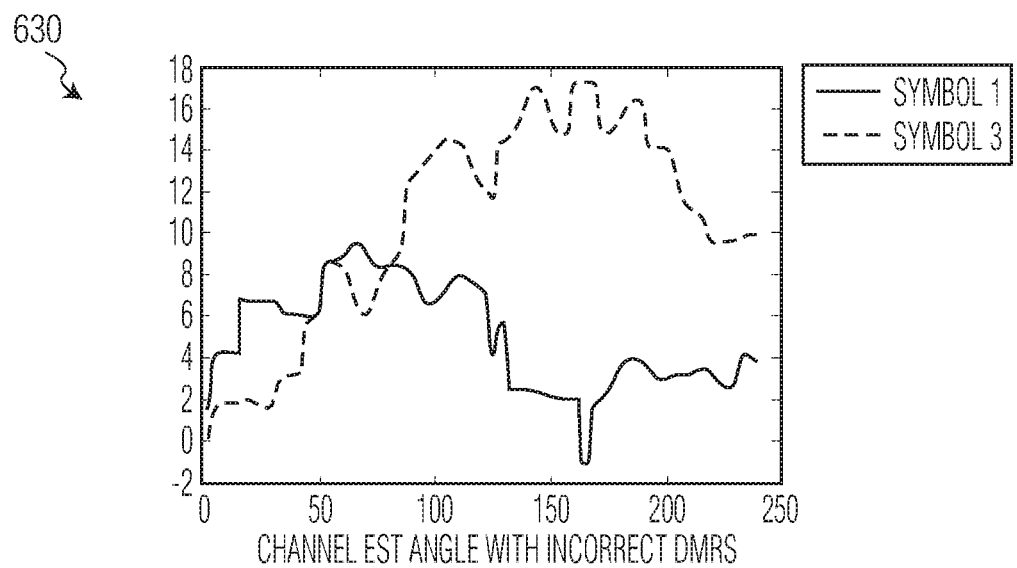

Embodiments rely upon a difference between how using a correct and an incorrect DMRS sequence affects the results of the least squares channel estimation. Incorrect DMRS sequences will provide channel estimates that are random or uncorrelated in the frequency domain. The incorrect channel estimates do not transition smoothly in the frequency domain, but rather appear haphazard. On the other hand, a correct channel estimate will transition smoothly across the frequency domain. This is illustrated by way of example in FIGS. 6A-6D. A comparison can be made between a channel estimate magnitude when the correct DMRS sequence is applied to for the least squares channel estimation in chart 610 of FIG. 6A and when an incorrect DMRS sequence is applied in chart 620 of FIG. 6B. The curve in chart 610 smoothly follows an arc to a single peak, while the curve in chart 620 has multiple peaks and valleys. A similar behavior is presented by the phase charts in 630 of FIG. 6C (with a correct DMRS sequence) and 640 of FIG. 6D (with an incorrect DMRS sequence).

The behavior of the channel estimation results are characterized mathematically as a differential of the channel coefficients in the frequency domain. This can be performed using two different metrics.

In a first metric, a channel differential power metric is calculated. $h_i(1)$, $h_i(2)$, ..., $h_i(K)$ are least square channel estimates for DMRS subcarriers in a PBCH symbol based on the $i^{th}$ candidate DMRS sequence. A differential power metric for (i) is then calculated using the following formula (410):

$$r(i) = \sum_{n=2}^{K} |h_i(n) - h_i(n-1)|^2$$

This is repeated for each of the (i) indices (420). An optimal (i) is calculated which has the lowest r(i) (430). A determination is then made as to whether the selected (i) is good for the signal as received. This determination is measured by comparing the differential power metric value against a pre-determined threshold and checking whether the differential power metric value exceeds the threshold or not. A "good" result should drive the metric to be close to zero. Once this determination is made, the selected index can be used for interpolation and demodulating (steps 335-365), as discussed above.

An alternative metric can be used in which a channel phase differential is calculated and used for determining r(i). As above, $h_i(1)$, $h_i(2)$, ..., $h_i(K)$ are the least square channel estimates for DMRS subcarriers in a PBCH symbol based on the $i^{th}$ candidate DMRS sequence. The channel differential metric for each (i) is then calculated as follows (410). A phase of the channels can be calculated from the least square channel estimates:

$$\theta_i(n) = \frac{h_i(n)}{|h_i(n)|}, \text{ for } n = 1, 2, \ldots, K$$

A phase differential metric can then be generated:

$$d\theta_i(n) = \theta_i(n) - \theta_{i-1}(n), \text{ for } n=2,3,\ldots,K$$

Where the variance of the phase differential metric is then:

$$r(i) = \text{var}\{d\theta_i(2), d\theta_i(3), \ldots, d\theta_i(K)\}$$

As above, this is repeated for each index (i) (420) and an optimal (i) is selected that has the lowest r(i) (430). A determination is made as to whether the selected (i) is good for the signal as received, and then the index is passed to the interpolation and demodulation steps 335-365.

Embodiments use the above metrics to quickly arrive at a good index before passing the index to the interpolation and demodulation steps, thereby reducing the latency introduced by multiple passes through the interpolation and demodulation process in traditional methods. Further, by minimizing the differential of either the signal magnitude or the phase, there is less of a chance of arriving at a false positive for the selected index than by taking the mean, as in the traditional methods.

Figure 5:
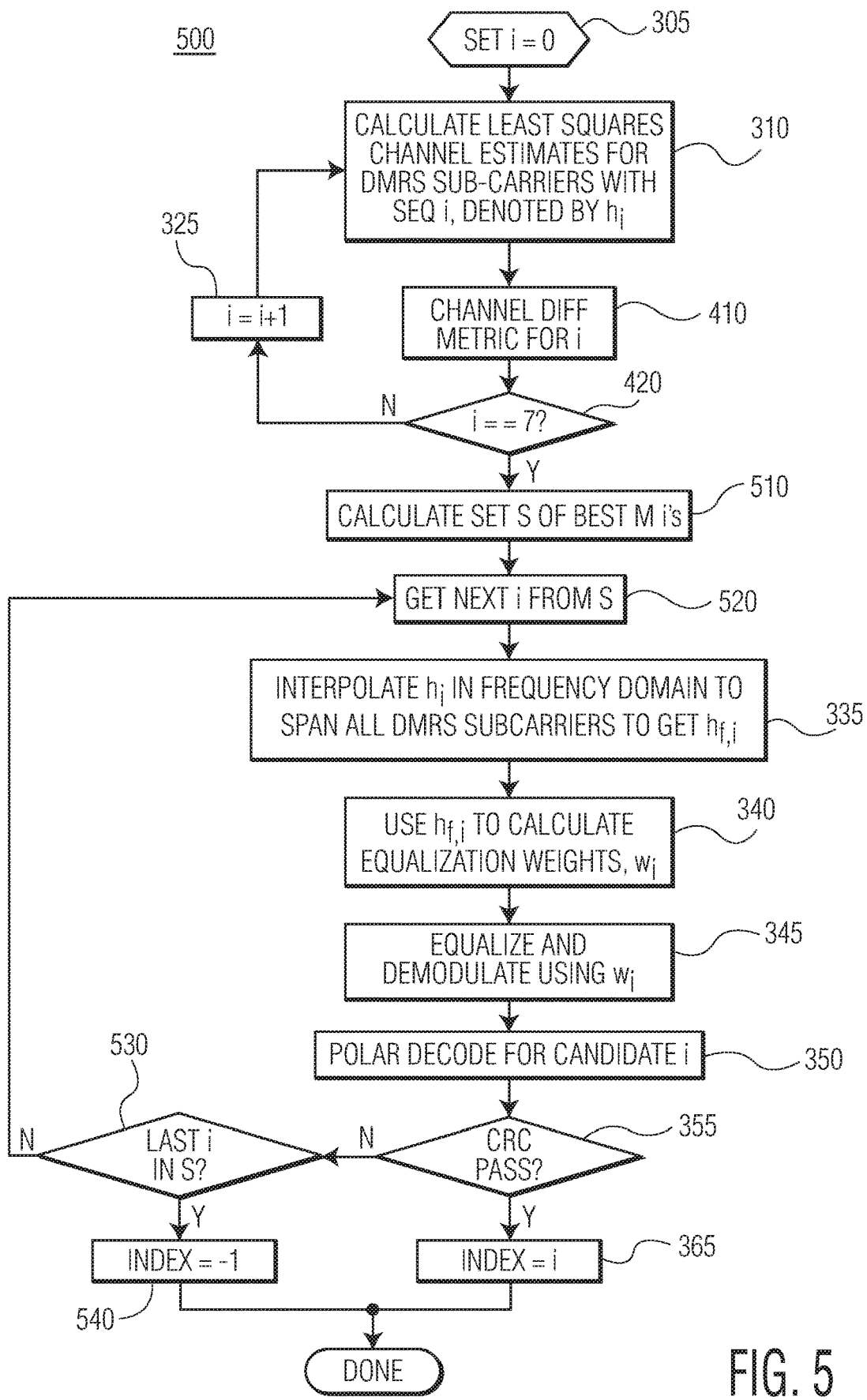
FIG. 5 is a simplified flow diagram illustrating an alternative process for determining the least significant bits of the SSB index, in accord with embodiments of the present invention.

FIG. 5 is a simplified flow diagram illustrating an alternative process for determining the least significant bits of the SSB index, in accord with embodiments of the present invention. The illustrated embodiment seeks to enhance the probability of arriving at a correct index (i) more quickly by selecting a set S that includes the best "m" candidate indices (i) from the above channel differential metrics (510), rather than just choosing a "best" one. The set of indices is then passed through the interpolation, demodulation, and decoding steps (335-350) one index at a time (520). When an index passes CRC (355), that index is chosen (365). If an index does not pass CRC, then a determination is made as to whether that was the last index in set S (530), and, if not, then a next index in set S is chosen (520) and the process is repeated until a correct index is found.

Figure 7:
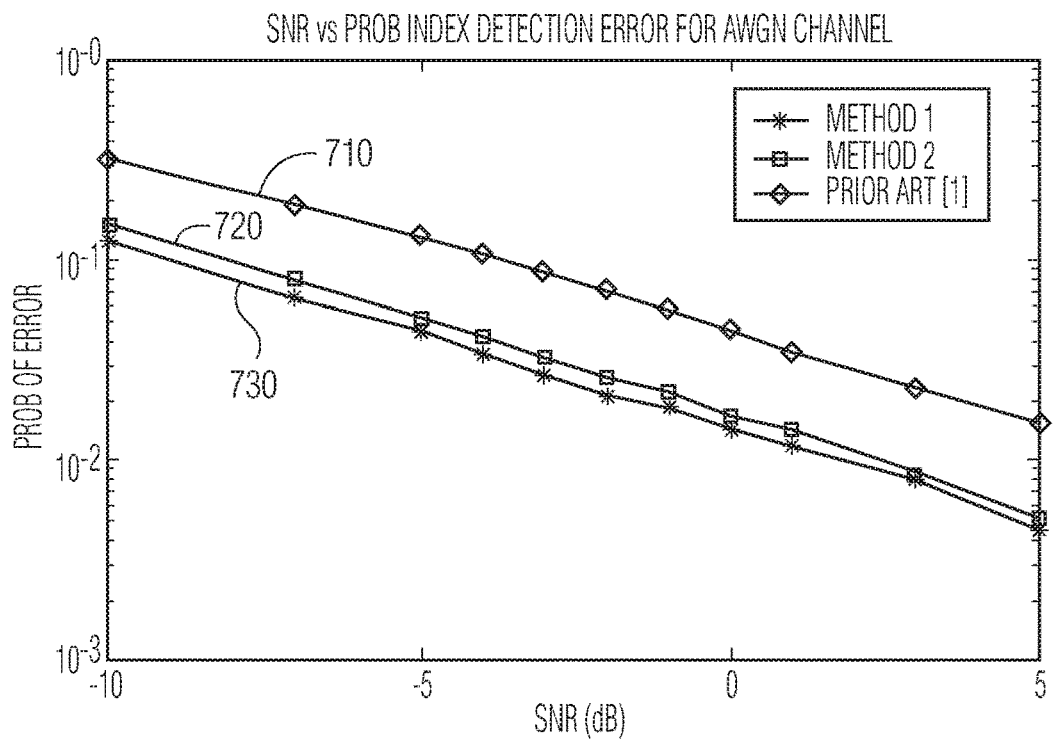
FIG. 7 is a plot illustrating a probability of error for index detection over a range of signal-to-noise ratio (SNR).

FIG. 7 is a plot illustrating a probability of error for index detection over a range of signal-to-noise ratio (SNR). As discussed above, embodiments of the present invention are more robust to noise in the signal. FIG. 7 illustrates this improvement over a prior process as illustrated in FIG. 3. As discussed above, the process from FIG. 3 uses a correlation metric that attempts to exploit the good auto/cross-correlation properties of the DMRS sequences themselves. Probability of error plot 710 illustrates performance of that process of FIG. 3. By comparison, the probility of error plots 720 and 730 illustrate performance of the two channel metrics, channel differential power metric and channel phase differential, respectively. As shown, the channel metrics of the present disclosure significantly out-perform the prior method, by as much as −5 dB in most probability regions.

Figure 8:
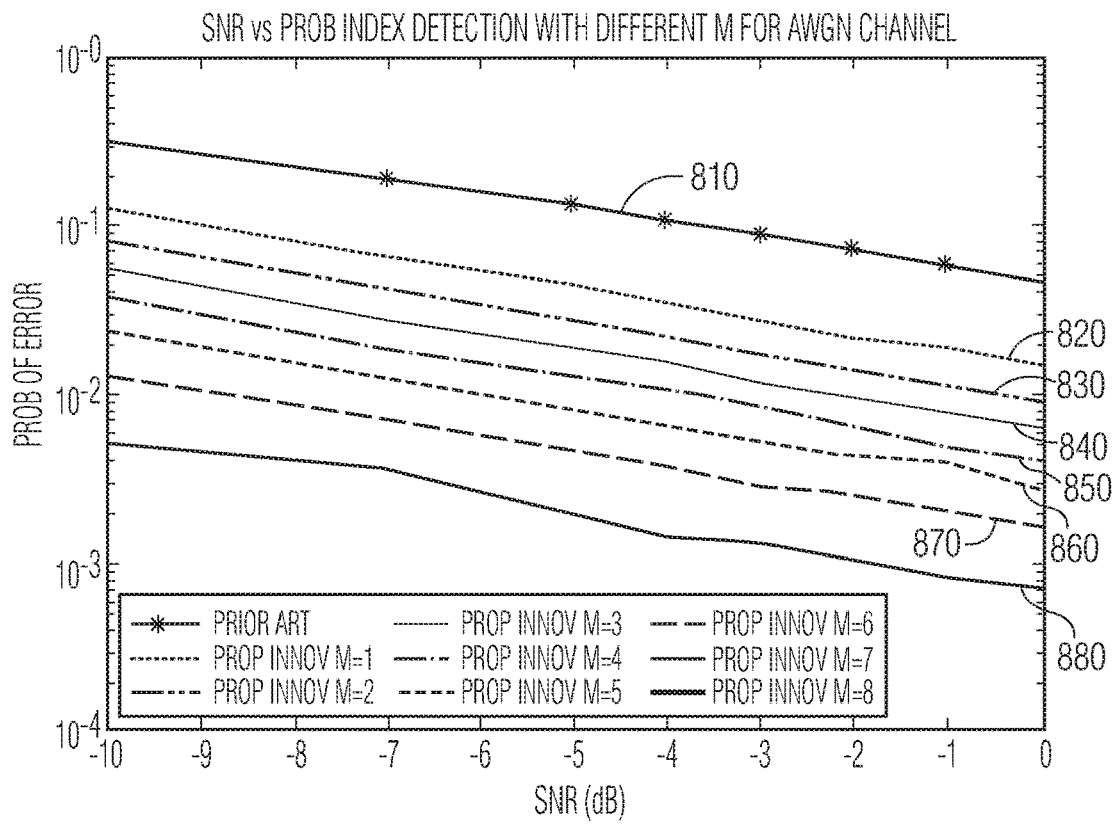
FIG. 8 is a plot further illustrating the performance improvement of the present method of that of the prior method.

FIG. 8 is a plot further illustrating the performance improvement of the present method of that of the prior method. The curves of FIG. 8 relate to the method illustrated in FIG. 5, and show decreasing probability of error as the number of indices (M) in set S are provided to the interpolation, demodulation, and decoding steps. Again, performance curves 820-880, representing performance as M increases from 1-8, respectively, show increasing robustness over the prior method curve 810, starting at a −5 dB improvement in SNR for a given probability of error.

By now it should be appreciated that there has been provided a method for detecting and decoding a primary broadcast channel (PBCH) transmitted by an access node at a user equipment device. The method includes determining a channel estimate associated with multiple candidate demodulation reference symbol (DMRS) sequences, calculating a channel differential metric for each candidate DMRS sequence using the channel estimate associated with the DMRS sequence, and selecting a set of preferred DMRS sequences based on the channel differential metric associated with each candidate DMRS sequence.

In one aspect of the above embodiment, determining a channel estimate for the multiple candidate DMRS sequences includes performing a least squares calculation using a sequence of received frequency domain subcarriers corresponding to DMRS locations in the PBCH.

In another aspect of the above embodiment, calculating the channel differential metric for each candidate DMRS sequence includes determining a differential power metric. In a further aspect, the differential power metric is $r(i)=\Sigma_{n=2}^{K}|h_i(n)-h_i(n-1)|^2$, where the channel estimate based on the $i^{th}$ candidate DMRS sequence is given by $h_i(1)$, $h_i(2)$, ..., $h_i(K)$. In another aspect of the above embodiment, calculating the channel differential metric for each candidate DMRS sequence includes determining a channel phase differential metric. In a further aspect, determining the channel phase differential metric includes: calculating a phase of the channels ($\theta_i(n)$), where the phase of the channels is $\theta_i(n)=h_i(n)/|h_i(n)|$, for n=1, 2, ...,K and the channel estimate based on the $i^{th}$ candidate DMRS sequence is given by $h_i(1)$, $h_i(2)$, ..., $h_i(K)$; calculating a phase differential metric ($d\theta_i(n)$), where the phase differential metric is $d\theta_i(n)=\theta_i(n)-\theta_i(n-1)$, for n=2, 3, ..., K; and, calculating a variance of the phase differential metric (r(n)), where the variance is $r(i)=var\{d\theta_i(2),d\theta_i(3),...,d\theta_i(K)\}$.

In another aspect of the above embodiment, selecting the set of preferred DMRS sequences includes selecting a set of DMRS sequence candidates corresponding to one or more lowest values for the channel differential metric. In a further aspect, the method further includes determining which member of the set of DMRS sequence candidates is a valid value. In another aspect for determining validity of a DMRS sequence candidate, the method can include comparing the corresponding channel differential metric with a predetermined threshold and rejecting the candidate if it does not meet the threshold condition. In yet a further aspect, determining which member of the set of DMRS sequence candidates is a valid value includes: interpolating the channel estimate for the DMRS sequence candidate (i) in the frequency domain to span all DMRS sequences to arrive at $h_{f,i}$; calculating equalization weights ($w_i$) using $h_{f,i}$; demodulating the PBCH using $w_i$; polar decoding the demodulated PBCH for the DMRS subcarrier candidate (i); and determining whether the decoded PBCH passes an error check. In another further aspect, the method further includes determining three least significant bits of a downlink beam index associated with the PBCH based on the selected set of preferred DMRS sequences.

Another embodiment of the present invention provides a wireless device that includes a multiple antenna subsystem and beamformer subsystem, and a digital controller coupled to the multiple antenna subsystem and beamformer subsystem. The digital controller is configured to detect and decode a PBCH transmitted by an access node by being configured to determine a channel estimate associated with multiple candidate DMRS sequences, calculate a channel differential metric for each candidate DMRS sequence using the channel estimate associated with the DMRS sequence, and select a set of preferred DMRS sequences using the channel differential metric associated with each candidate DMRS sequence.

In one aspect of the above embodiment, the digital controller is configured to determine the channel estimate for the multiple candidate DMRS sequences by being further configured to perform a least squares calculation using a sequence of received frequency domain subcarriers corresponding to DMRS locations in the PBCH.

In another aspect of the above embodiment, the digital controller is configured to calculate the channel differential metric for each candidate DMRS sequence by being configured to determine a differential power metric. In a further aspect, the differential power metric is $r(i)=\Sigma_{n=2}^{K}|h_i(n)-h_i(n-1)|^2$, where the channel estimate based on the $i^{th}$ candidate DMRS sequence is given by $h_i(1)$, $h_i(2)$, ..., $h_i(K)$. In another aspect of the above embodiment, the digital controller is configured to calculate the channel differential metric for each candidate DMRS sequence by being configured to determine a channel phase differential metric. In a further aspect, the digital controller is configure to determine the channel phase differential metric by being further configured to: calculate a phase of the channels ($\theta_i(n)$), where the phase of the channels is $$\theta_i(n) = \frac{h_i(n)}{|h_i(n)|},$$

for n=1, 2, ...,K and the channel estimate based on the it candidate DMRS sequence is given by $h_i(1)$, $h_i(2)$, ..., $h_i(K)$; calculate a phase differential metric ($d\theta_i(n)$), where the phase differential metric is $d\theta_i(n)=\theta_i(n)-\theta_i(n-1)$, for n=2, 3, ..., K; and, calculate a variance of the phase differential metric (r(n)), where the variance is $r(i)=var\{d\theta_i(2),d\theta_i(3),...,d\theta_i(K)\}$.

In another aspect of the above embodiment, the digital controller is configured to select the set of preferred DMRS sequences by being further configured to select a set of DMRS sequence candidates corresponding to one or more lowest values for the channel differential metric. In a further aspect, the digital controller is further configured to determine which member of the set of DMRS sequence candidates is a valid value. In another aspect for determining validity of a DMRS sequence candidate, the digital controller is further configured to compare the corresponding channel differential metric with a predetermined threshold and to reject the DMRS sequence candidate if the candidate does not meet the threshold condition. In still a further aspect, the digital controller is further configured to determine which member of the set of DMRS sequence candidates is a valid value by being further configured to: interpolate the channel estimate for the DMRS sequence candidate (i) in the frequency domain to span all DMRS sequences to arrive at $h_{f,i}$; calculate equalization weights ($w_i$) using $h_{f,i}$; demodulate the PBCH using $w_i$; polar decode the demodulated PBCH for the DMRS subcarrier candidate (i); and determine whether the decoded PBCH passes an error check. In yet another further aspect, the digital controller is further configured to determine three least significant bits of a downlink beam index associated with the PBCH based on the selected set of preferred DMRS sequences.

In another aspect of the above embodiment, the set of preferred DMRS sequences may have only one member corresponding to the "best" candidate as indicated by the channel differential metric.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

All or some of the software described herein may be received elements of system 10, for example, from computer readable media or other media on other computer systems. Such computer readable media may be permanently, removably or remotely coupled to a user equipment (e.g., UE 110). The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for detecting and decoding a primary broadcast channel (PBCH) transmitted by an access node at a user equipment device, the method comprising:
   determining channel estimates associated with multiple candidate demodulation reference symbol (DMRS) sequences;
   calculating a channel differential metric for each candidate DMRS sequence, using the channel estimate associated with the DMRS sequence; and
   selecting a set of preferred DMRS sequences based on the channel differential metric associated with each candidate DMRS sequence.

2. The method of claim 1 wherein said determining channel estimates associated with the multiple candidate DMRS sequences comprises:

performing a least squares calculation using a sequence of received frequency domain subcarriers corresponding to DMRS locations in the PBCH.

3. The method of claim 1 wherein said calculating the channel differential metric corresponding to each candidate DMRS sequence comprises determining a differential power metric.

4. The method of claim 3, wherein
a channel estimate based on the $i^{th}$ candidate DMRS sequence is $h_i(1), h_i(2), \ldots, h_i(K)$; and
the differential power metric is $r(i)=\Sigma_{n=2}^{K}|h_i(n)-h_i(n-1)|^2$.

5. The method of claim 1 wherein said calculating the channel differential metric for each candidate DMRS sequence comprises determining a channel phase differential metric.

6. The method of claim 5, wherein
a channel estimate based on the $i^{th}$ candidate DMRS sequence is given by $h_i(1), h_i(2), \ldots, h_i(K)$; and
determining the channel phase differential metric comprises
calculating a phase of the channels ($\theta_i(n)$), wherein the phase of the channels is $$\theta_i(n) = \frac{h_i(n)}{|h_i(n)|}, \text{ for } n = 1, 2, \ldots, K,$$

calculating a phase differential metric ($d\theta_i(n)$), wherein the phase differential metric is $d\theta_i(n)=\theta_i(n)-\theta_i(n-1)$, for $n=2, 3, \ldots, K$, and
calculating a variance of the phase differential metric ($r(i)$), wherein the variance is $r(i)=\text{var}\{d\theta_i(2), d\theta_i(3), \ldots, d\theta_i(K)\}$.

7. The method of claim 1 wherein said selecting the set of preferred DMRS sequences comprises selecting a set of DMRS sequence candidates corresponding to one or more lowest values for the channel differential metric.

8. The method of claim 7 further comprising determining which member of the set of DMRS sequence candidates is a valid value.

9. The method of claim 8 wherein said determining which member of the set of DMRS sequence candidates is a valid value comprises:
interpolating the channel estimate for the DMRS sequence candidate (i) in the frequency domain to span all DMRS sequences to arrive at $h_{f,i}$;
calculating equalization weights ($w_i$) using $h_{f,i}$;
demodulating the PBCH using $w_i$;
polar decoding the demodulated PBCH for the DMRS subcarrier candidate (i); and
determining whether the decoded PBCH passes an error check.

10. The method of claim 7 further comprising determining three least significant bits of a downlink beam index associated with the PBCH based on the selected set of preferred DMRS sequences.

11. A wireless device comprising:
a multiple antenna subsystem and beamformer subsystem; and
a digital controller, coupled to the multiple antenna subsystem and beamformer subsystem, and configured to detect and decode a primary broadcast channel (PBCH) transmitted by an access node by being configured to:
determine channel estimates associated with multiple candidate demodulation reference symbol (DMRS) sequences;
calculate a channel differential metric for each candidate DMRS sequence, using the channel estimate associated with the DMRS sequence; and
select a set of preferred DMRS sequences using the channel differential metric associated with each candidate DMRS sequence.

12. The wireless device of claim 11 wherein the digital controller is configured to determine the channel estimates associated with the multiple candidate DMRS sequences by being further configured to perform a least squares calculation using a sequence of received frequency domain subcarriers corresponding to DMRS locations in the PBCH.

13. The wireless device of claim 11 wherein the digital controller is configured to determine the channel differential metric for each candidate DMRS sequence by being configured to determine a differential power metric.

14. The wireless device of claim 13, wherein
a channel estimate based on the $i^{th}$ candidate DMRS sequence is given by $h_i(1), h_i(2), \ldots, h_i(K)$; and
the differential power metric is $r(i)=\Sigma_{n=2}^{K}|h_i(n)-h_i(n-1)|^2$.

15. The wireless device of claim 11 wherein the digital controller is configured to determine the channel differential metric for each candidate DMRS sequence by being further configured to determine a channel phase differential metric.

16. The wireless device of claim 15, wherein
a channel estimate based on the $i^{th}$ candidate DMRS sequence is given by $h_i(1), h_i(2), \ldots, h_i(K)$; and
the wireless device is configured to determine the channel phase differential metric by being further configured to calculate a phase of the channels ($\theta_i(n)$), wherein the phase of the channels is $$\theta_i(n) = \frac{h_i(n)}{|h_i(n)|},$$

for n=1, 2, ... K,
calculate a phase differential metric ($d\theta_i(n)$), wherein the phase differential metric is $d\theta_i(n)=\theta_i(n)-\theta_i(n-1)$, for $n=2, 3, \ldots, K$, and
calculate a variance of the phase differential metric ($r(i)$), wherein the variance is $r(i)=\text{var}\{d\theta_i(2), d\theta_i(3), \ldots, d\theta_i(K)\}$.

17. The wireless device of claim 11 wherein the digital controller is configured to select the set of preferred DMRS sequences by being further configured to select a set of DMRS sequence candidates corresponding to one or more lowest values for the channel differential metric.

18. The wireless device of claim 17 wherein the digital controller is further configured to determine which member of the set of DMRS sequence candidates is a valid value.

19. The wireless device of claim 18 wherein the digital controller is further configured to determine which member of the set of DMRS sequence candidates is a valid value by being further configured to:
interpolate the channel estimate for the DMRS sequence candidate (i) in the frequency domain to span all DMRS sequences to arrive at $h_{f,i}$;
calculate equalization weights ($w_i$) using $h_{f,i}$;
demodulate the PBCH using $w_i$;
polar decode the demodulated PBCH for the DMRS subcarrier candidate (i); and determine whether the decoded PBCH passes an error check.

20. The wireless device of claim 17 wherein the digital controller is further configured to determine three least significant bits of a downlink beam index associated with the PBCH based on the selected set of preferred DMRS sequences.

* * * * *